Patented Sept. 3, 1935

2,013,401

UNITED STATES PATENT OFFICE 2,013,401

PROCESS OF DECOLORIZING ALKALINE EARTH SULPHATES

Harold Simmons Booth, Cleveland Heights, Ohio

No Drawing. Application July 20, 1932,
Serial No. 623,599

1 Claim. (Cl. 134—58)

This invention relates to a method for the decolorization of alkaline earth sulphates and their preparation for pigment purposes. It has been worked out particularly with a view toward making available for white pigment purposes the large quantities of barium sulphate occurring naturally as barytes, without the expensive steps, at present absolutely essential, of first chemically decomposing the sulphate, and, after appropriate further chemical treatment, reprecipitating by means of a soluble sulphate. The invention is equally available to naturally occurring strontium or calcium sulphates, or to any of the alkaline earth sulphate resulting, in an impure state, as a by-product of chemical reactions.

As stated above, before barium sulphate can be used as a white pigment, it must be freed from the impurities normally present with it by natural occurrence, the most deleterious being iron. Reactive sulphur is also very objectionable in pigment barium sulphate, this sulphur resulting from the standard procedure for solubilizing the barytes, a necessary preliminary to any procedure if the barium sulphate is later to be reprecipitated. The standard procedure consists in reducing the crushed barytes with carbon at a high temperature, producing barium sulphide with evolution of carbon monoxide and theoretically with the reduction of any iron present to sulphide or to oxide or to metallic form, all of which iron compounds are insoluble in water. The product of this reduction is leached with water and the barium sulphate precipitated by sulphuric acid, and should theoretically be pure, but due to hydrolysis in contact with air, and to other causes, a certain amount of the barium sulphide is very frequently carried into the final product, which, if mixed with white lead in the making of paint, gives rise to a gray or black coloration; also, iron sulphide is slowly converted by air and moisture to a soluble form which may stain the resulting pigment a yellowish or rust color. Furthermore, the presence of these impurities tends to accelerate the cure when barium sulphate is used as a rubber pigment. Pure barium sulphate, however, is one of the most permanent white pigments, known to science and would receive a much increased use in paint, rubber, laquers, etc., in case a sufficiently cheap process could be found to purify it to the necessary extent, particularly without elaborate chemical treatment.

Any process which would merely dissolve the barium sulphate (the same holds true for the other alkaline earth sulphates) and leave all impurities like iron, silica, etc., behind, followed by a removal of the solvent, should be ideally suited for the purpose in view. Molten salts which dissolve barium sulphate, such as NaCl, CaCl$_2$, Na$_2$SO$_4$, etc. have been viewed eagerly for this purpose, but the great hopes held out for solution in such fused salts, followed by dissolving the salts away in water, have not materialized. While it is true that the iron, etc. occurring naturally with the barium sulphate is insoluble in molten salts of the type described, the relatively small proportion of such iron results in part of it dispersing readily in the bath in extremely finely divided form. It has therefore proven impossible, in actual practice, to decant away the barium sulphate solution in salt, from all the contaminants present in the original barium sulphate, with the result that part of the iron is reprecipitated with the barium sulphate when the melt is treated with water, yielding a discolored pigment. Because of this practical difficulty of separating all the iron away from the barium sulphate in the molten bath, this process, despite its intriguing possibilities, has been quite generally abandoned, and manufacturers have gone back to the older chemical treatment.

However, I have found that if, to a solution of barium (or other alkaline earth) sulphate in a molten inorganic compound like salt, contaminated by iron, there be added a salt or acid anhydride which combines with the iron to form a colorless stable compound, preferably one insoluble in water, the discoloring effect of the iron is completely neutralized, and a pure white pigment results even though much or all of the iron remains in the barium sulphate. Of course, in practice, I first act to remove as much of the iron mechanically as possible, so as to cut down the amount of reactant salt or anhydride necessary.

My preferred practice is to first crush the barytes to easily handled size, and dissolve it in the molten salt, e. g., sodium chloride. The barium sulphate goes completely into solution (over 40% of BaSO$_4$ will dissolve in molten sodium chloride) while iron oxide and silica and most of the other impurities remain insoluble, so that a considerable part of them can be removed by decantation of the clear liquid, as stated above. To the decantate I then add a reagent of the type mentioned before—viz., one which by reaction with the iron will form a stable colorless compound. Examples of successful reagents for the purpose in view are the following:

(A) Alkali (or alkaline earth) polysilicates
(e. g. Na$_2$O.2SiO$_2$)

(B) Alkali (or alkaline earth) metal monobasic or dibasic phosphates.
(C) Alkali (or alkaline earth) metal tribasic phosphates in the presence of an acid salt or pyrosalt
(D) Monobasic magnesium phosphate—$MgH_4(PO_4)_2$
(E) Dibasic magnesium phosphate—$MgHPO_4$
(F) Tribasic magnesium phosphate in the presence of an acid salt such as sodium hydrogen sulphate $NaHSO_4$, or a pyrosalt, such as $Mg_2P_2O_7$.
(G) Sodium borates—$NaBO_3$ or $Na_2B_4O_7$
(H) Sodium metantimonate—$NaSbO_3$
(I) Sodium metarsenate—$NaAsO_3$
(J) Sodium aluminate—$Na_2O.(Al_2O_3)$ also any solid acid anhydride, viz: of silicon, phosphorus, arsenic, antimony, aluminum, boron, with or without an activating agent such as sodium acid sulphate, though I prefer to have one present. In every case the result is the formation in the bath of a compound of iron which is colorless, viz: silicate, phosphate, borate, antimonate, arsenate, aluminate, etc. The purpose of the alkali-acid-salt is only to break up and activate the less reactive substance such as the alkali earth phosphates which need an acid-salt to render them more reactive. The anhydrides likewise work better in the presence of an alkali to stimulate their reactivity.

I prefer to employ molten sodium chloride as the dissolving agent, although potassium chloride, calcium chloride, etc. can be used, or mixtures thereof. Sodium chloride is particularly satisfactory since it is extremely limpid when molten and the solubility of barytes therein so high, and even 40% does not render it viscous. Hence the concentrations employable are very much greater than with wet processes and the speed of all reactions much increased.

When the melt has been treated with the reagent chosen to decolorize the iron and sufficiently stirred to cause a thorough dissemination therein, it is preferably quenched with water, which causes a precipitation of the barium sulphate in a very finely divided state, having the maximum hiding power from the point of view of a pigment, and being much more finely divided than the product precipitated by sulphuric acid from aqueous solution. All the above described reagents improve the color over what it would be without their use, but the best of all I have found so far are the phosphates which yield products of a whiteness surpassing the "chemically pure" product of the best makers, and exhibiting a high degree of permanence and stability.

Strontium sulphate can be obtained in pure white form by treating celestite in exactly the same manner as above described for barytes. Its solubility in molten substances herein indicated as suitable solvents is substantially the same as that of barytes and in the absence of some decolorizing step such as those pointed out is generally incapable of any paint or other pigment use. By treatment in accordance with my invention, the final removal of the salt by solution in water leaves the material in the same finely divided condition as described in the case of barium sulphate.

Calcium sulphate can be purified from native gypsum or anhydrite or from by-products of other processes producing calcium sulphate exactly the same way as barium sulphate from barytes above described, and has the advantage over the chemically precipitated product that it is anhydrous, finer, less soluble in water, lighter, and whiter than the usual product, and with greater hiding power.

It is manifest that mixtures of two or more of the sulphates can be treated just as any one of them, resulting in combination pigments of great value. It is my belief (though the value of the product is in no way dependent thereupon) that at least some of such material exists, under the conditions, even after treatment with water, in the form of true double salts, which have their own unique physical characteristics.

For the foregoing described procedures the cheapest and most available solvent is ordinary sodium chloride, although the chlorides of potassium and lithium are also generally usable (and those of rubidium and caesium also as I believe except for their cost), while the chlorides of magnesium, calcium, barium, and/or strontium can be used in some cases. Also other salts than the chlorides can be employed such as the alkali bromides, carbonates, fluorides, hydroxides, iodides, phosphates, and sulphates. In general the reaction described can be produced in any anhydrous molten salt which does not decompose at the temperature in question or enter into the reaction, although for practical purposes the salt employed as a solvent usually ought to be soluble in water so as to enable the ready removal thereof and the separation of the solutes. This consideration, taken in conjunction with the necessity of employing a substance which melts at a reasonable temperature and neither decomposes nor enters into the reaction, restricts the choice to a comparatively narrow range, and I believe there are few outside those above named and their close analogues which are suitable.

There are in several instances some decided advantages in the use of potassium chloride instead of sodium chloride, chiefly as regards the ease of solution and recovery. The difference in solubility of sodium chloride between hot and cold water is not so very great, but in the case of potassium chloride it is extremely great. Accordingly when potassium chloride is used as the melt, and the molten mass with whatever products is dissolved therein is decanted into water, a comparatively small amount of liquid is required, since the heat of the melt raises it to the boiling point. If now this saturated solution be rapidly removed from the insoluble product and allowed to cool, a large part of the potassium chloride will crystallize out without the employment of further heat to evaporate the same as would be necessary with sodium chloride, and this economy of fuel is in some cases more than enough to offset the difference in cost of the two substances.

I do not wish to be understood as asserting that all the above named fusible anhydrous compounds can be used with equal facility or satisfaction. Some like the hydroxides tend to enter into the reaction; some like the iodides tend to decompose too readily; some have too high a melting point; and some will not dissolve particular raw materials, although the alkali chlorides will operate with all substances herein mentioned and undoubtedly with many others, wherefore I hold myself entitled to all uses of my invention without need for further description.

When I state that the molten bath which is the one essential characteristic of all the procedures herein described must consist of a substance which does not enter into chemical reaction with any of the solutes, products, or reagents, I mean merely that no such chemical combinations must occur as will evolve heat or produce persistent new compounds, and I do not intend to bring in question any theories of solution, dissociation, etc.

I do not limit myself to the specific method indicated in the description for contacting the reacting substances. It is in some cases advantageous to mix intimately all or part of the reactants and the solvent salts or substances and melt them together while they are being continuously added. I wish my claims to be construed without limitation on the method or order of contacting the reacting substances and solvent salts or substances. As an example of this I may cite the case of purification of barium sulphate. Here I find it advantageous to inject into the heated zone continuously a suitable intimate powdered mixture of barytes and sodium chloride which is continuously melted and runs through the furnace, whereupon the purification reagent is continuously added and the melt immediately quenched in water.

Having thus described my invention what I claim is:

The process which comprises dissolving an alkaline earth sulphate, containing iron oxide as an impurity, in a molten substance of the group comprising sodium chloride, potassium chloride, lithium chloride and mixtures thereof, separating a portion of the iron oxide mechanically and reacting upon the remainder thereof in such solution with a compound of the group consisting of alkali monobasic phosphates, whereby said iron oxide is converted into a colorless compound.

HAROLD SIMMONS BOOTH.